United States Patent
Ayyar et al.

(10) Patent No.: US 10,402,758 B2
(45) Date of Patent: Sep. 3, 2019

(54) IDENTIFYING ADDITIONAL APPLICATIONS FOR COMPARISON TO AN APPLICATION WITH WHICH ONLINE SYSTEM USERS INTERACT

(71) Applicant: Facebook, Inc., Menlo Park, CA (US)

(72) Inventors: Srikant Ramakrishna Ayyar, Menlo Park, CA (US); Akin Husnu Babayigit, Richmond (GB); Jing Bao, Redwood City, CA (US); Estelle Fume, London (GB); Namit Rai Surana, San Carlos, CA (US)

(73) Assignee: Facebook, Inc., Menlo Park, CA (US)

( * ) Notice: Subject to any disclaimer, the term of this patent is extended or adjusted under 35 U.S.C. 154(b) by 884 days.

(21) Appl. No.: 14/883,571

(22) Filed: Oct. 14, 2015

(65) Prior Publication Data

US 2017/0109677 A1    Apr. 20, 2017

(51) Int. Cl.
*G06Q 10/00*      (2012.01)
*G06Q 10/06*      (2012.01)
*G06Q 30/02*      (2012.01)
*H04L 29/08*      (2006.01)
(Continued)

(52) U.S. Cl.
CPC ........... *G06Q 10/063* (2013.01); *G06Q 30/02* (2013.01); *G06Q 30/0201* (2013.01); *G06Q 10/06393* (2013.01); *G06Q 40/12* (2013.12); *G06Q 50/01* (2013.01); *H04L 67/02* (2013.01);
(Continued)

(58) Field of Classification Search
CPC .. G06Q 30/02; G06Q 30/0201; G06Q 10/063; G06Q 10/06393
See application file for complete search history.

(56) References Cited

U.S. PATENT DOCUMENTS

| | | | |
|---|---|---|---|
| 7,343,334 B1 * | 3/2008 | Adduci, Jr. ............ | G06Q 10/06 705/36 R |
| 2012/0233165 A1 * | 9/2012 | Kirkpatrick ............... | G06F 8/77 707/737 |

(Continued)

OTHER PUBLICATIONS

Xu, Y., Lin, M., Lu, H., Cardone, G., Lane, N., Chen, Z., . . . Choudhury, T. (2013). Preference, Context and Communities: A Multi-faceted Approach to Predicting Smartphone App Usage Patterns. Proceedings of the 17th Annual International Symposium on Wearable Computers, 69-76. (Year: 2013).*

*Primary Examiner* — William S Brockington, III
(74) *Attorney, Agent, or Firm* — Fenwick & West LLP

(57) ABSTRACT

An online system maintains information describing interactions by its users with various applications. To allow evaluation of an application against other applications, the online system identifies additional applications having a threshold measure of similarity to the application and with which at least threshold number of users interacted during a time interval. Based on a number of users who interacted with various additional applications and amounts of revenue obtained by additional applications, the online system selects a group of additional applications. The online system selects additional applications from the group based on scores for the additional applications determined from user interaction and revenue obtained by the additional applications and provides information about the additional applications selected from the group to an entity associated with the application.

20 Claims, 2 Drawing Sheets

(51) Int. Cl.
*G06Q 40/00* (2012.01)
*G06Q 50/00* (2012.01)

(52) U.S. Cl.
CPC ............ *H04L 67/04* (2013.01); *H04L 67/125* (2013.01); *H04L 67/20* (2013.01); *H04L 67/306* (2013.01)

(56) References Cited

U.S. PATENT DOCUMENTS

| | | | |
|---|---|---|---|
| 2015/0074106 A1* | 3/2015 | Ji | G06F 16/284 707/736 |
| 2015/0088955 A1* | 3/2015 | Hendrick | G06Q 30/02 709/201 |
| 2015/0120742 A1* | 4/2015 | Liu | G06Q 30/02 707/740 |
| 2016/0048850 A1* | 2/2016 | Wooten | H04L 67/22 705/7.29 |
| 2016/0092768 A1* | 3/2016 | Patil | G06F 8/61 706/46 |
| 2016/0098566 A1* | 4/2016 | Patil | G06F 21/60 726/26 |
| 2016/0147765 A1* | 5/2016 | Glover | G06F 8/00 707/723 |

* cited by examiner

IDENTIFYING ADDITIONAL APPLICATIONS FOR COMPARISON TO AN APPLICATION WITH WHICH ONLINE SYSTEM USERS INTERACT

BACKGROUND

This disclosure relates generally to generating metrics describing performance of an application with users of an online system, and more particularly to selecting additional applications to generate metrics for comparison with the application's metrics.

Online systems, such as social networking systems, allow users to connect to and to communicate with other users of the online system. Users create profiles on an online system that are tied to their identities and include information about the users, such as interests and demographic information. The users may be individuals or entities such as corporations or charities. Because of the increasing popularity of online systems, and the significant amount of user specific information maintained by online systems, an online system provides an ideal forum for users to easily communicate information about themselves to other users and share content with other users. For example, users may share their interests with other users by posting content to the online system that is subsequently maintained by the online system and presented to additional users. Content provided to the online system by a user may be declarative information provided by a user, status updates, check-ins to locations, images, photographs, videos, text data, or any other information a user wishes to share with additional users of the online system.

Additionally, many online systems allow their users to identify and obtain various applications, which may provide additional content or additional functionality to the users. An online system may store information describing interactions by its users with various applications. For example, the online system maintains information associated with an application describing types of interactions by users with the application or describing amounts of revenue received by the application from various users. Based on maintained information associated with an application, the online system may determine various metrics describing performance of the application, such as a number of unique online system users who interacted with the application within a time interval or an amount of revenue obtained by the application from online system users. An entity associated with the application may receive or obtain the metrics determined by the online system to evaluate the application's performance.

An online system may also provide the entity associated with the application with information about additional applications, allowing the entity to evaluate the application's performance relative to the additional applications. For example, the online system computes metrics for the application and for the additional applications and provides the metrics for the application and for the additional applications to the entity associated with the application. However, different applications are directed to different types of users and have different goals for performance, so metrics of additional applications having different audiences of users or receiving different types of interactions from users may provide little information for an entity associated with an application to evaluate the application's performance.

SUMMARY

Online system users interact with various applications to receive content or perform other interactions. The online system stores information describing interactions by its users with various applications, such as various types of interactions by users with application or revenue provided to applications by the users. In various embodiments, the online system generates one or more metrics for an application based on the information stored by the online system and provides the one or more metrics to an entity associated with the application (e.g., a user or a third party system associated with the application). This allows the entity to evaluate performance of the application based on interactions by online system users with the application or based on revenue received from online system users.

To allow an entity associated with an application to better evaluate performance of an application, the online system selects various additional applications and identifies the additional applications or metrics associated with the additional application to the entity associated with the application. This allows the entity associated with the application to evaluate the application's performance relative to the additional applications. To provide the entity associated with the application with information about additional applications most likely to be relevant to the application, the online system selects additional applications having at least a threshold measure of similarity to the application and generates scores for the additional applications. Based on the scores, the online system selects a group of applications and provides the entity associated with the application with information about applications in the group. For example, the online system provides the entity associated with the application with one or more metrics describing performance of applications in the group or with information identifying applications in the group.

The online system selects additional applications having at least a threshold measure of similarity to the application. In various embodiments, the measure of similarity between an application and other applications is determined based on genres associated with the application and with the additional applications. For example, additional applications having a common genre as the application are determined to have at least the threshold measure of similarity to the application. In other embodiments, the online system determines measures of similarity between the application and additional applications based on common characteristics of users who interacted with the application and who interacted with the additional applications. As an example, the online system determines additional applications which were interacted with by users having at least a threshold number or a threshold percentage of characteristics matching characteristics of users who interacted with the application. Additionally, the online system determines a number of users who interacted with various additional applications within a time interval based on information associated with the additional applications by the online system, such as a number of unique users who interacted with various additional applications within a month. The online system selects additional applications having at least a threshold measure of similarity and with which at least a threshold number of users interacted during the time interval.

For each of the selected additional applications, the online system determines a score based on amounts of revenue received by various selected additional applications and numbers of users who interacted with various selected additional applications during a time interval. In various embodiments, the online system determines an interaction score for a selected additional application based on a number of users who interacted with the selected additional application during the time interval and determines a revenue score for the selected additional application based on an amount of revenue received (e.g., an amount of revenue received during the time interval) by the selected additional application. The online system may determine the interaction score for a selected additional application based on a number of unique users who interacted with the selected additional application during a time interval as well as an average number of unique users who interacted with the selected additional applications during the time interval. Similarly, the online system determines the revenue score for a selected additional application based on an amount of revenue received by the selected additional application (e.g., an amount of revenue received during a time interval) as well as an average amount of revenue by the selected additional applications. In some embodiments, the online system determines a group of the selected additional applications based on the revenue metrics or the interaction metrics associated with various selected additional applications. For example, the online system determines a group of selected applications having a revenue metric exceeding a threshold value and having an interaction metric exceeding another threshold value.

Based on scores of selected applications in the group, the online system selects additional applications from the group and provides information about the additional applications selected from the group to the entity associated with the application. In one embodiment, the online system ranks the additional applications in the group based on their scores and selects additional applications from the group having at least a threshold position in the ranking. Alternatively, the online system selects additional applications from the group having at least a threshold score. In some embodiments, the online system provides the entity associated with the application with one or more metrics describing performance of the selected additional applications. Alternatively, the online system provides the entity associated with the application with information identifying the selected additional applications.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
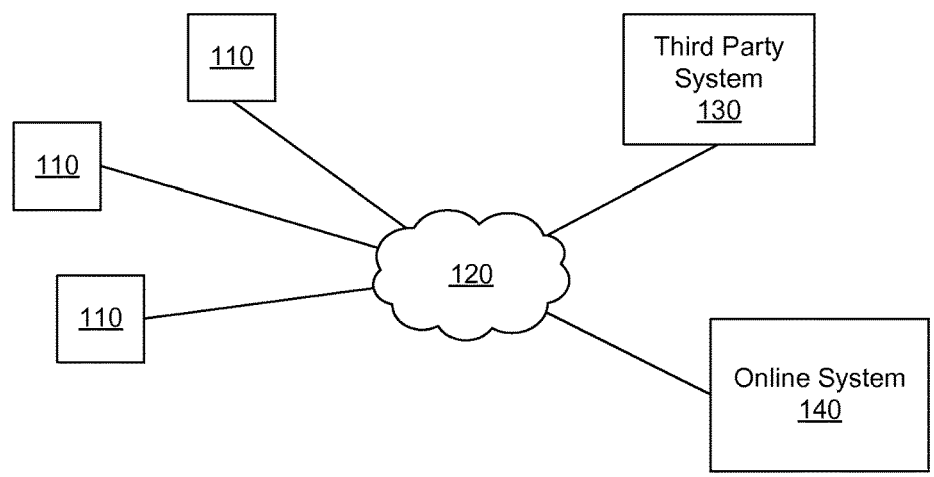
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein may be adapted to online systems that are social networking systems, content sharing networks, or other systems providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
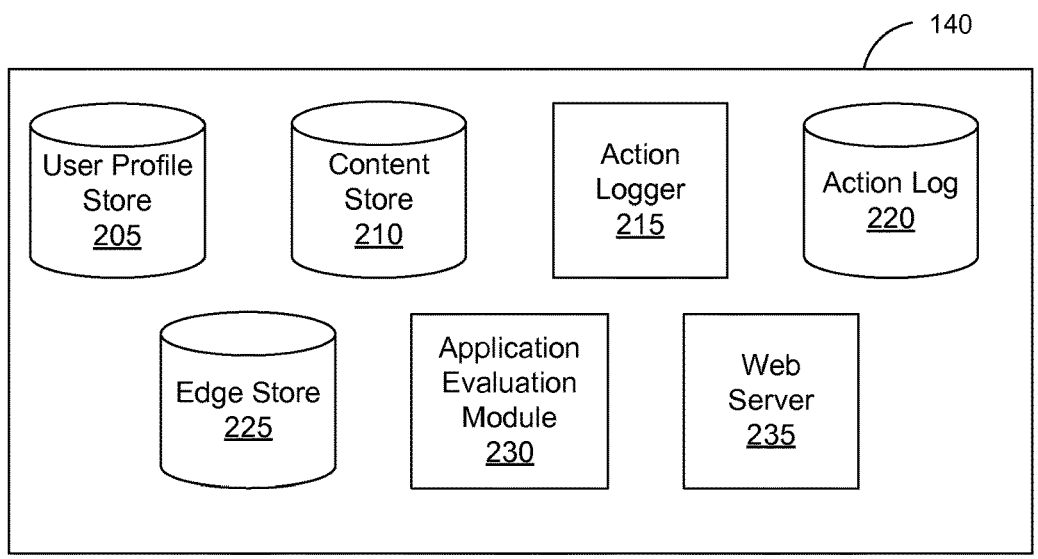
FIG. 2 is a block diagram of an online system, in accordance with an embodiment.

FIG. 2 is a block diagram of an architecture of the online system 140. For example, the online system 140 is a social networking system. The online system 140 shown in FIG. 2 includes a user profile store 205, a content store 210, an action logger 215, an action log 220, an edge store 225, an application evaluation module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, social networking system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

Various users of the online system 140 interact with applications provided by one or more third party systems 130 or by the online system 140. The application evaluation module 230 retrieves information stored by the online system 140 describing user interactions with various applications and generates one or more metrics describing performance of the applications. For example, the application evaluation module 230 retrieves information from the action log 220 describing interactions by various users with an application and determines a number of unique users who interacted with the application during a time interval (e.g., a number of unique online system users who interacted with the application during a month prior to a current time). As another example, the application evaluation module 230 determines an average revenue the application received from users who interacted with the applications. In other embodiments, the application evaluation module 230 determines a number of unique users who installed the application during a time interval, an average length of time with which users interact with the application during a time interval, a percentage or a number of users who installed the application and interacted with the application a specified time interval after installation of the application (i.e., a retention rate of the application), a number of unique users who installed the application within a specified time interval, or determines any other suitable metric describing interaction with the application by various users. Additionally, the application evaluation module 230 may retrieve characteristics of users who interacted with the application from the user profile store 205, from the action log 220, or from the edge store 225 and generates different metrics for the application based on users having different characteristics. For example, the application evaluation module 230 determines a number of unique users in a certain age range, in a specific geographic location, or having any other suitable common characteristic or characteristics who interacted with the application or determines an amount of revenue received by the application from users having a common characteristic.

To allow a third party system 130 or other entity to evaluate performance of an application, the application evaluation module 230 provides metrics generated for one or more additional applications to the entity. This allows the entity to compare metrics for the application with metrics for the additional applications to evaluate the application's performance relative to the additional applications. To allow an entity associated with an application to evaluate the application's performance against additional applications most likely to be relevant to the application, the application evaluation module 230 selects applications having at least a threshold measure of similarity to the application and generates scores for the selected applications. Based on the scores, the application evaluation module 230 selects a group of applications. The group of applications or metrics determined for applications in the group are provided to the entity associated with the application, allowing the entity to evaluate metrics for the application with respect to metrics for applications in the group.

As further described below in conjunction with FIG. 3, the measure of similarity between an application and other applications may be determined based on genres associated with the application and with the other applications. For example, other applications having a common genre as the application are determined to have at least the threshold measure of similarity to the application. In other embodiments, the application evaluation module 230 determines measures of similarity between the application and other applications based on common characteristics of users who interacted with the application and who interacted with the other applications, as further described below in conjunction with FIG. 3. Additionally, the online system 140 determines a number of users who interacted with various applications during a time interval and selects applications having at least the threshold measure of similarity to the application and with which at least a threshold number of users have interacted during a time interval. This causes the selected applications to have a threshold measure of similarity to the application and to have received a threshold amount of user interaction.

The application evaluation module 230 determines a score for each of the selected applications based on amounts of revenue received by various selected applications and numbers of users who interacted with various selected applications during a time interval. In various embodiments, the application evaluation module 230 determines an interaction score for a selected application based on a number of users who interacted with the selected application during the time interval and determines a revenue score for the selected application based on an amount of revenue received (e.g., an amount of revenue received during the time interval) by the selected application. As further described below in conjunction with FIG. 3, the application evaluation module 230 determines the interaction score for a selected application based on a number of unique users who interacted with the selected application during a time interval as well as an average number of unique users who interacted with the selected applications during the time interval. Similarly, the application evaluation module 230 determines the revenue score for a selected application based on an amount of revenue received by the selected application (e.g., an amount of revenue received during a time interval) as well as an average amount of revenue by the selected applications. In some embodiments, the application evaluation module 230 determines a group of the selected applications based on the revenue metrics or the interaction metrics associated with selected applications. For example, the application evaluation module 230 determines a group as selected applications having a revenue metric exceeding a threshold value and having an interaction metric exceeding another threshold value. Based on scores of selected applications in the group, the application evaluation module 230 selects applications from the group and provides information about the applications selected from the group to an entity (e.g., a user or a third party system 130) associated with the application, as further described below in conjunction with FIG. 3.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, WEBOS® or BlackberryOS.

Selecting Additional Applications for Comparison to an Identified Application

Figure 3:
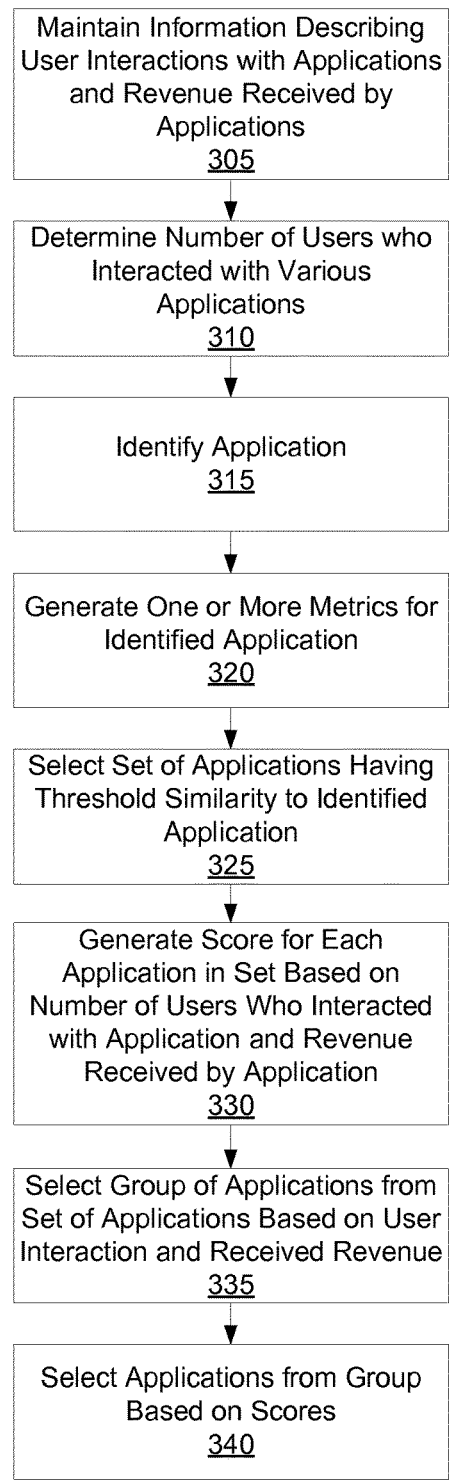
FIG. 3 is a flowchart of a method for identifying applications with which users of an online system interact for comparison to another application with which users of the online system interact, in accordance with an embodiment.

FIG. 3 is a flowchart of an embodiment of a method for identifying a group of applications with which users of an online system 140 interact for comparison to a selected application with which users of the online system 140 interact. In various embodiments, the method includes different and/or additional steps than those described in conjunction with FIG. 3. Additionally, steps of the method may be performed in different orders than the order described in conjunction with FIG. 3 in some embodiments.

The online system 140 maintains 305 information describing interactions by users of the online system 140 with various applications, as well as describing revenue obtained by the various applications. In some embodiments, the online system 140 associates information identifying online system users who performed various interactions with an application during a time interval (e.g., a day, an hour, etc.) in association with an identifier of the application. For example, the online system 140 maintains 305 information identifying users who interacted with the application as well as timestamps indicating when a user interacted with the application. Information identifying an amount of revenue received by the application from the online system users is also stored in association with the identifier of the application. For example, the online system 140 maintains information associated with an identifier of an application specifying an amount of revenue received by the application during a time interval; the amount of revenue may be obtained from interactions by the online system users with the application or from other suitable sources in various embodiments.

Additionally, the online system 140 includes information describing various characteristics of different applications.

In some embodiments, the online system 140 associates a genre or category with each application and stores the genre or category of an application in association with an identifier of the application. Other information may be stored in association with an application by the online system 140. For example, the online system 140 identifies users who interacted with an application based on information stored by the online system 140 describing actions performed by its users and retrieves characteristics of the identified users (e.g., demographic information from user profiles of the identified users, connections between the identified users and other users, actions performed by the identified users, etc.). Based on the retrieved characteristics, the online system 140 determines one or more common characteristics of users who interacted with the application and stores the common characteristics in association with the identifier of the application. For example, a common characteristic of users who interacted with the application is a characteristic of at least a threshold percentage or of at least a threshold number of users who interacted with the application. Additionally, the online system 140 may associate one or more keywords with the application, with a keyword associated with the application describing a subject of the application, a use of the application, or other information associated with the application.

Based on the maintained information associated with various applications, the online system 140 determines 310 a number of users who interacted with different applications during a time interval. For example, the online system 140 determines 310 a number of monthly active users with each application. A monthly number of active users for an application identifies a number of unique online system users who interacted with the application within a 30 day interval. However, the online system 140 may determine 310 any suitable information identifying a number of users who interacted with different applications during a time interval.

The online system 140 identifies 315 an application from the plurality of applications and generates 320 one or more metrics for the identified application based at least in part on the maintained information identifying interactions by users with the identified application or describing revenue obtained by the identified application. In some embodiments, a third party system 130 or a user of the online system 140 provides a request to the online system 140 identifying 315 the application and specifying one or more metrics to generate 320 for the application. The online system 140 may generate 320 various metrics for the identified application, such as a number of unique users who interacted with the identified application during a time interval (e.g., a number of unique online system users who interacted the identified application during a month prior to a current time). As another example, the online system 140 determines an average revenue the identified application received from users who interacted with the identified application. In other embodiments, the online system 140 generates 320 one or more metrics identifying: a number of unique users who installed the identified application during a time interval, an average length of time with which users interact with the identified application during a time interval, a percentage or a number of users who installed the identified application and interacted with the identified application at a specified time interval after installation of the application (i.e., a retention rate of the application), a number of unique users who installed the identified application within a specified time interval, an average frequency with which users interact with the identified application during a time interval, or any other suitable metric describing interaction with the application by various users. In some embodiments, a metric generated 320 for the identified application may identify demographic information of users who performed one or more interactions with the identified application based on user profile information from user profiles associated with users who performed the interactions by the online system 140. Additionally, the online system 140 may retrieve characteristics of users who interacted with the identified application based on information associated with the users by the online system 140 and generate different metrics for the identified application based on users having different characteristics. For example, the online system 140 determines a number of unique users in a certain age range, in a specific geographic location, or having any other suitable common characteristic or characteristics who interacted with the identified application or determines an amount of revenue received by the identified application from users having a common characteristic.

To allow the third party system 130 associated with the identified application to evaluate the identified application's performance against other applications, the online system 140 selects 325 a set of applications that each have at least a threshold measure of similarity to the identified application and with which at least a threshold number of users have interacted during a time interval. In some embodiments, an application associated with a genre that is associated with the identified application has at least the threshold measure of similarity to the identified application. Alternatively, the online system 140 determines the threshold measure of similarity between an application and the identified application based on characteristics of users who interacted with the application that match characteristics of users who interacted with the identified application. In some embodiments, the measure of similarity between the application and the identified application increases as a number of characteristics of users who interacted with the application matching characteristics of users who interacted with the identified application increases or increases as a percentage of characteristics of users who interacted with the application matching characteristics of users who interacted with the identified application increases. Determining the measure of similarity based on characteristics of users who interacted with the identified application and who interacted with an application allows the online system 140 to select 325 applications based on similarities between users who interact with the applications. Alternatively, the online system 140 selects 325 applications based on amounts of revenue received by the applications and by the identified applications or based on user interaction with the applications and with the identified application. For example, the online system 140 selects 325 applications that received amounts of revenue during a time interval within a threshold amount of an amount of revenue received by the identified application or selects 325 applications with which a number of users interacted during a time interval within a threshold amount of a number of users who interacted with the identified application during the time interval.

For each application in the set, the online system 140 generates 330 a score. In various embodiments, the score for an application in the set is based on an amount of interaction by online system users with the application and an amount of revenue obtained by the application. For example, the online system 140 determines an interaction metric for an application in the set application based at least in part on a number of users interacting with the application in the set during a time interval and a number of users interacting with the set of applications during the time interval. Similarly, the online system 140 determines a revenue metric for the application in the set application based at least in part on an amount of revenue obtained by the application in the set and an amount of revenue generated by the set of applications. The online system 140 combines the interaction metric and the revenue metric for the application in the set to generate 330 the score for the application in the set.

In one embodiment, the online system 140 determines the interaction metric for an application by calculating a difference between a number of users who interacted with the application and a mean number of users who interacted with applications in the set. Additionally, the online system 140 determines a standard deviation of users interacting with the applications in the set based on differences between a number of users interacting with each application in the set and the mean number of users who interacted with applications in the set. The online system 140 determines the interaction metric for the application as a ratio of the difference between the number of users who interacted with the application and the mean number of users who interacted with applications in the set and the standard deviation of users interacting with the applications in the set.

Similarly, the online system 140 determines the revenue metric for the application by calculating a difference between an amount of revenue received by the application and an average amount of revenue received by applications in the set. Additionally, the online system 140 determines a standard deviation of amounts of revenue received by applications in the set based on differences between an amount of revenue received by each application in the set and the average amount of revenue received by the applications in the set. The online system 140 determines the revenue metric for the application as a ratio of the difference between the amount of revenue received by the application and the average amount of revenue received by applications in the set and the standard deviation of amounts of revenue received by applications in the set.

In various embodiments, the online system 140 generates 330 the score for the application in the set as a sum of the interaction metric for the application and the revenue metric for the application. The online system 140 may apply weights to the interaction metric and the revenue metric for the application and combine the weighted interaction metric and the weighted revenue metric to generate 330 the score for the application. For example, the online system 140 scales both the interaction metric and the revenue metric by 0.5 and combines the scaled interaction metric and the scaled revenue metric to generate 330 the score for the application. In other embodiments, the online system 140 applies different weights to the interaction metric and to the revenue metric when generating 330 the score for the application.

The online system 140 selects 335 a group of applications from the applications in the set based on the interaction metrics and the revenue metrics for applications in the set. In one embodiment, the online system 140 selects 335 applications from the set of applications that have at least a threshold interaction metric and at least a threshold revenue metric. In other embodiments, the online system 140 selects 335 applications from the set of applications having at least a threshold interaction metric or having at least a threshold revenue metric. Alternatively, the online system 140 generates ranks applications in the set based on their interaction metrics and also ranks applications in the set based on their revenue metrics and selects 335 applications having at least a threshold position in the ranking based on interaction metrics and having at least an additional threshold position in the ranking bases on revenue metrics; in some embodiments, the threshold position and the additional threshold position are the same.

Based on the scores for the applications in the group, the online system 140 selects 340 one or more applications. In one embodiment, the online system 140 ranks the applications in the group based on their scores and selects 340 applications from the group having at least a threshold position in the ranking. For example, the online system 140 ranks the applications in the group so applications with higher scores have higher positions in the ranking and selects 340 applications from the group having the highest 15 positions in the ranking. Alternatively, the online system 140 selects 340 applications having at least a threshold score from the group. Hence, the applications selected from the group are applications most likely to be relevant to the identified applications and to allow an entity (e.g., a third party system 130) and have received significant amounts of user interaction and revenue from online system users.

In some embodiments, the online system 140 generates one or more metrics for each of the selected applications based on information maintained 305 by the online system 140 for the selected applications and provides the generated metrics to an entity associated with the identified application (e.g., a user associated with the identified application or a third party system 130 associated with the identified application). For example, the online system 140 determines a number of unique users who interacted with each of the selected applications during a time interval (e.g., a number of unique online system users who interacted with each selected application during a month prior to a current time). As another example, the online system 140 determines an average revenue each selected application receives from users who interacted with the selected applications. In other embodiments, the online system 140 generates metrics identifying: a number of unique users who installed the each of the selected applications during a time interval, an average length of time with which users interact with the each of the selected applications during a time interval, a percentage or a number of users who installed each of the selected applications application and interacted with each of the selected applications at a specified time interval after installation of the application (i.e., a retention rate of the application), a number of unique users who installed each of the selected applications within a specified time interval, an average frequency with which users interact with each of the selected applications during a time interval, or any other suitable metric describing interaction with the selected applications by various users. In some embodiments, a metric generated for selected applications may identify demographic information of users who performed one or more interactions with the a selected application based on user profile information from user profiles associated with users who performed the interactions by the online system 140. Additionally, the online system 140 may retrieve characteristics of users who interacted with a selected application based on information associated with the users by the online system 140 and generate different metrics for the selected application based on users having different characteristics. For example, the online system 140 determines a number of unique users within a certain age range, in a specific geographic location, or having any other suitable common characteristic or characteristics. The online system 140 may generate metrics for selected applications based on users having any suitable common characteristic in various embodiments.

Alternatively or additionally, the online system 140 provides information identifying the applications selected 340 from the group to the entity associated with the identified application. For example, the online system 140 provides the entity associated with the identified application with titles or names of each of the selected applications. The online system 140 may also provide the entity associated with the identified application with identifiers corresponding to each of the selected applications. In some embodiments, the online system 140 provides additional information along with information identifying a selected application. For example, the online system 140 identifies one or more characteristics common to users who provided a threshold amount of revenue to the selected application within a time interval or one or more characteristics common to at least a threshold number or percentage of users who interacted with the selected application.

In some embodiments, the online system 140 applies one or more rules to metrics generated 320 for the identified applications and metrics generated for various selected applications and provides one or more recommendations to an entity associated with the identified application based on the rules. For example, based on a difference between an amount of revenue received by the identified application and an average amount of revenue received by the selected applications, the online system 140 recommends one or more modifications to the identified application, such as modifications to increase user interaction with the identified application. As another example, based on a difference between a number of unique users who interacted with the identified application and an average number of unique users who interacted with the selected applications, the online system 140 recommends one or more modifications to the identified application, such as modifications to increase user interaction with the identified application (e.g., presenting notifications from the identified application to users). Various rules may be based on metrics for the identified application and for one or more selected applications based on interactions by users having common characteristics (e.g., in an age range, in a location) with the identified application and with the one or more selected applications, with the rules recommending modifications to the application or actions for an entity associated with the application to perform to increase interaction by users having the common characteristic or revenue obtained from users having the common characteristic. For example, if the identified application received an amount of revenue from users having a common characteristic less than an average amount of revenue received by the selected applications from users having the common characteristic, the online system 140 provides recommendations to the entity associated with the identified application to modify pricing of items in the application, to tailor content in the application for users having the common characteristic, or to provide advertisements or other content describing the identified application to users having the common characteristic.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   maintaining information at an online system describing interactions by users of the online system with each of a plurality of applications and revenue received by each of the plurality of applications, each application associated with a genre;
   determining a first number of users interacting with each application from the plurality of applications during a time interval based on the maintained information;
   identifying an application from the plurality of applications;
   generating one or more metrics for the identified application based at least in part on the interactions by users with the identified application and revenue received by the identified application;
   selecting a set of applications from the plurality of applications, each application in the set having at least a threshold measure of similarity to the identified application and with which at least a threshold number of users interacted during the time interval;
   generating scores for each application in the selected set of applications by,
      determining an interaction metric for a selected application in the selected set based at least in part on a second number of users interacting with the selected application in the selected set during the time interval and a third number of users interacting with the set of applications during the time interval;
      determining a revenue metric for the selected application in the selected set based at least in part on a first amount of revenue received by the selected application in the selected set and a second amount of revenue received by the set of applications; and
      generating a score for the selected application based at least in part on the interaction metric and the revenue metric;
   selecting a group of applications having at least a threshold interaction metric and at least a threshold revenue metric; and
   selecting one or more applications from the group of applications based at least in part on the generated scores.

2. The method of claim 1, further comprising:
   generating one or more metrics for each of the selected one or more applications based at least in part on the interactions by users with the selected one or more applications and revenue received by the selected one or more applications; and
   providing the one or more metrics for the identified application and the one or more metrics for each of the selected one or more applications to an entity associated with the identified application.

3. The method of claim 1, further comprising:
   providing information identifying the selected one or more applications from the group of applications to an entity associated with the identified application.

4. The method of claim 1, wherein selecting one or more applications from the group of applications based at least in part on the generated scores comprises:
   ranking the group of applications based at least in part on the generated scores; and
   selecting the one or more applications having at least a threshold position in the ranking.

5. The method of claim 1, wherein generating scores for each application in the selected set of applications comprises:
   determining a mean number of users interacting with the set of applications based at least in part on the maintained information;
   determining a first standard deviation of users interacting with the set of applications based at least in part on the determined mean and the third number of users interacting with the set of applications;
   determining an average amount of revenue received by the set of applications based at least in part on the maintained information; and
   determining a second standard deviation of amounts of revenue received by the set of applications based at least in part on the determined average and the second amount of revenue received by the set of applications.

6. The method of claim 5, wherein determining the interaction metric for the selected application in the selected set based at least in part on the second number of users interacting with the selected application in the selected set during the time interval and the third number of users interacting with the set of applications during the time interval comprises:
  determining a difference between the second number of users interacting with the selected application in the selected set during the time interval and the mean number of users interacting with the set of applications during the time interval; and
  determining the interaction metric as a ratio of the determined difference between the second number of users interacting with the selected application in the selected set during the time interval to the first standard deviation of users interacting with the set of applications.

7. The method of claim 6, wherein determining the revenue metric for the selected application in the selected set based at least in part on an amount of revenue received by the selected application in the selected set and an amount of revenue received by the set of applications comprises:
  determining a difference between the first amount of revenue received by the selected application in the selected set and the average amount of revenue received by the set of applications; and
  determining the revenue metric as a ratio of the determined difference between the first amount of revenue received by the selected application in the selected set to the second standard deviation of amounts of revenue received by the set of applications.

8. The method of claim 1, wherein selecting the set of applications from the plurality of applications comprises:
  selecting applications associated with a first genre by the online system matching a second genre of the identified application and with which at least the threshold number of users interacted during the time interval.

9. The method of claim 1, wherein selecting the set of applications from the plurality of applications comprises:
  selecting applications which were interacted with by users having at least a threshold number of characteristics matching characteristics of users who interacted with the identified application and with which at least the threshold number of users interacted during the time interval.

10. The method of claim 1, further comprising:
  generating one or more metrics for each of the selected one or more applications based at least in part on the interactions by users with the selected one or more applications and revenue received by the selected one or more applications;
  applying one or more rules to the generated one or more metrics for each of the selected one or more applications and to the generated one or more metrics for the identified application; and
  providing one or more recommendations to an entity associated with the identified application based at least in part on application of the one or more rules.

11. A computer program product comprising a non-transitory computer readable storage medium having instructions encoded thereon that, when executed by a processor, cause the processor to:
  maintain information at an online system describing interactions by users of the online system with each of a plurality of applications and revenue received by each of the plurality of applications, each application associated with a genre;
  determine a first number of users interacting with each application from the plurality of applications during a time interval based on the maintained information;
  identify an application from the plurality of applications;
  generate one or more metrics for the identified application based at least in part on the interactions by users with the identified application and revenue received by the identified application;
  select a set of applications from the plurality of applications, each application in the set having at least a threshold measure of similarity to the identified application and with which at least a threshold number of users interacted during the time interval;
  generate scores for each application in the selected set of applications by,
    determining an interaction metric for a selected application in the selected set based at least in part on a second number of users interacting with the selected application in the selected set during the time interval and a third number of users interacting with the set of applications during the time interval;
    determine a revenue metric for the selected application in the selected set based at least in part on a first amount of revenue received by the selected application in the selected set and a second amount of revenue received by the set of applications; and
    generate a score for the selected application based at least in part on the interaction metric and the revenue metric;
  select a group of applications having at least a threshold interaction metric and at least a threshold revenue metric; and
  select one or more applications from the group of applications based at least in part on the generated scores.

12. The computer program product of claim 11, wherein the non-transitory computer readable storage medium further has instructions encoded thereon that, when executed by the processor cause the processor to:
  generate one or more metrics for each of the selected one or more applications based at least in part on the interactions by users with the selected one or more applications and revenue received by the selected one or more applications; and
  provide the one or more metrics for the identified application and the one or more metrics for each of the selected one or more applications to an entity associated with the identified application.

13. The computer program product of claim 11, wherein the non-transitory computer readable storage medium further has instructions encoded thereon that, when executed by the processor cause the processor to:
  provide information identifying the selected one or more applications from the group of applications to an entity associated with the identified application.

14. The computer program product of claim 11, wherein select one or more applications from the group of applications based at least in part on the generated scores comprises:
  rank the group of applications based at least in part on the generated scores; and
  select the one or more applications having at least a threshold position in the ranking.

15. The computer program product of claim 11, wherein generate scores for each application in the selected set of applications comprises:
  determine a mean number of users interacting with the set of applications based at least in part on the maintained information;
  determine a first standard deviation of users interacting with the set of applications based at least in part on the determined mean and the third number of users interacting with the set of applications;
determine an average amount of revenue received by the set of applications based at least in part on the maintained information; and
determine a second standard deviation of amounts of revenue received by the set of applications based at least in part on the determined average and the second amount of revenue received by the set of applications.

16. The computer program product of claim 15, wherein determine the interaction metric for the selected application in the selected set based at least in part on the second number of users interacting with the selected application in the selected set during the time interval and the third number of users interacting with the set of applications during the time interval comprises:
   determine a difference between the second number of users interacting with the selected application in the selected set during the time interval and the mean number of users interacting with the set of applications during the time interval; and
   determine the interaction metric as a ratio of the determined difference between the second number of users interacting with the selected application in the selected set during the time interval to the first standard deviation of users interacting with the set of applications.

17. The computer program product of claim 16, wherein determine the revenue metric for the selected application in the selected set based at least in part on the first amount of revenue received by the selected application in the selected set and the second amount of revenue received by the set of applications comprises:
   determine a difference between the amount of revenue received by the selected application in the selected set and the average amount of revenue received by the set of applications; and
   determine the revenue metric as a ratio of the determined difference between the first amount of revenue received by the selected application in the selected set to the second standard deviation of amounts of revenue received by the set of applications.

18. The computer program product of claim 11, wherein select the set of applications from the plurality of applications comprises:
   select applications associated with a first genre by the online system matching a second genre of the identified application and with which at least the threshold number of users interacted during the time interval.

19. The computer program product of claim 11, wherein select the set of applications from the plurality of applications comprises:
   select applications which were interacted with by users having at least a threshold number of characteristics matching characteristics of users who interacted with the identified application and with which at least the threshold number of users interacted during the time interval.

20. The computer program product of claim 11, wherein the non-transitory computer readable storage medium further has instructions encoded thereon that, when executed by the processor cause the processor to:
   generate one or more metrics for each of the selected one or more applications based at least in part on the interactions by users with the selected one or more applications and revenue received by the selected one or more applications;
   apply one or more rules to the generated one or more metrics for each of the selected one or more applications and to the generated one or more metrics for the identified application; and
   provide one or more recommendations to an entity associated with the identified application based at least in part on application of the one or more rules.

* * * * *